United States Patent [19]
Chen

[11] Patent Number: 5,575,587
[45] Date of Patent: Nov. 19, 1996

[54] TIDE-OPERATED DRIVING SYSTEM

[76] Inventor: Leang S. Chen, 5F, No. 5-4, Alley 7, Lane 377, Chung Cheng Rd., Shin Chuang City, Taipei Hsien, Taiwan

[21] Appl. No.: 372,079

[22] Filed: Jan. 13, 1995

[51] Int. Cl.$^6$ .................................................... E02B 9/05
[52] U.S. Cl. ................................................. 405/76; 60/398
[58] Field of Search ........................... 405/75, 76, 77; 60/398

[56] References Cited

U.S. PATENT DOCUMENTS

| | | | |
|---|---|---|---|
| Re. 11,807 | 1/1900 | Rogowski | 405/76 X |
| 3,925,986 | 12/1975 | Barwick | 60/398 |
| 4,078,382 | 3/1978 | Ricafranca et al. | 60/398 |
| 4,271,668 | 6/1981 | McCormick | 60/398 |
| 4,286,347 | 9/1981 | Modisette | 60/398 |
| 4,383,413 | 5/1983 | Wells | 60/398 X |
| 4,441,316 | 4/1984 | Moody | 60/398 |
| 4,564,312 | 1/1986 | Munoz Saiz | 405/76 |
| 5,005,357 | 4/1991 | Fox | 60/398 |

*Primary Examiner*—Tamara L. Graysay
*Assistant Examiner*—Frederick L. Lagman
*Attorney, Agent, or Firm*—Donald C. Casey

[57] ABSTRACT

A tide-operated driving system including a variable air chamber having a broad bottom opening put under the water of the sea and a small top opening disposed above the seaside, and a motor having a center shaft and a plurality of centrifugal type vanes spaced around the center shaft, wherein the movement of the tide induces a reciprocating flow of air to rotate the vanes, causing the center shaft to turn an external mechanism.

2 Claims, 5 Drawing Sheets

TIDE-OPERATED DRIVING SYSTEM

BACKGROUND OF THE INVENTION

The present invention relates to mechanical driving systems, and relates more particularly to such a mechanical driving system which is operated by the reciprocating flow of air, which is induced by the movement of the tide of the sea.

A variety of natural resources, such as wind force, geothermal energy, solar energy, etc., can be used for generating power without polluting the environment. The power held beneath the tide of the seat is unlimited, however it is still not well utilized so far.

SUMMARY OF THE INVENTION

The major object of the present invention is to provide a driving system which fully utilizes the potential energy of the tide to drive a mechanism. According to the preferred embodiment of the present invention, the driving system comprises a variable air chamber having a broad bottom opening put under the water of the sea and a small top opening disposed above the seaside, and a motor having a center shaft and a plurality of centrifugal type vanes spaced around the center shaft. When the tide rises and falls, a reciprocating flow of air is induced and guided through the vanes of the rotor, causing them to turn the center shaft, and therefore the external mechanism which is coupled to the center shaft Of the rotor is started.

DETAILED DESCRIPTION OF THE PREFERRED EMBODIMENT

Figure 1:
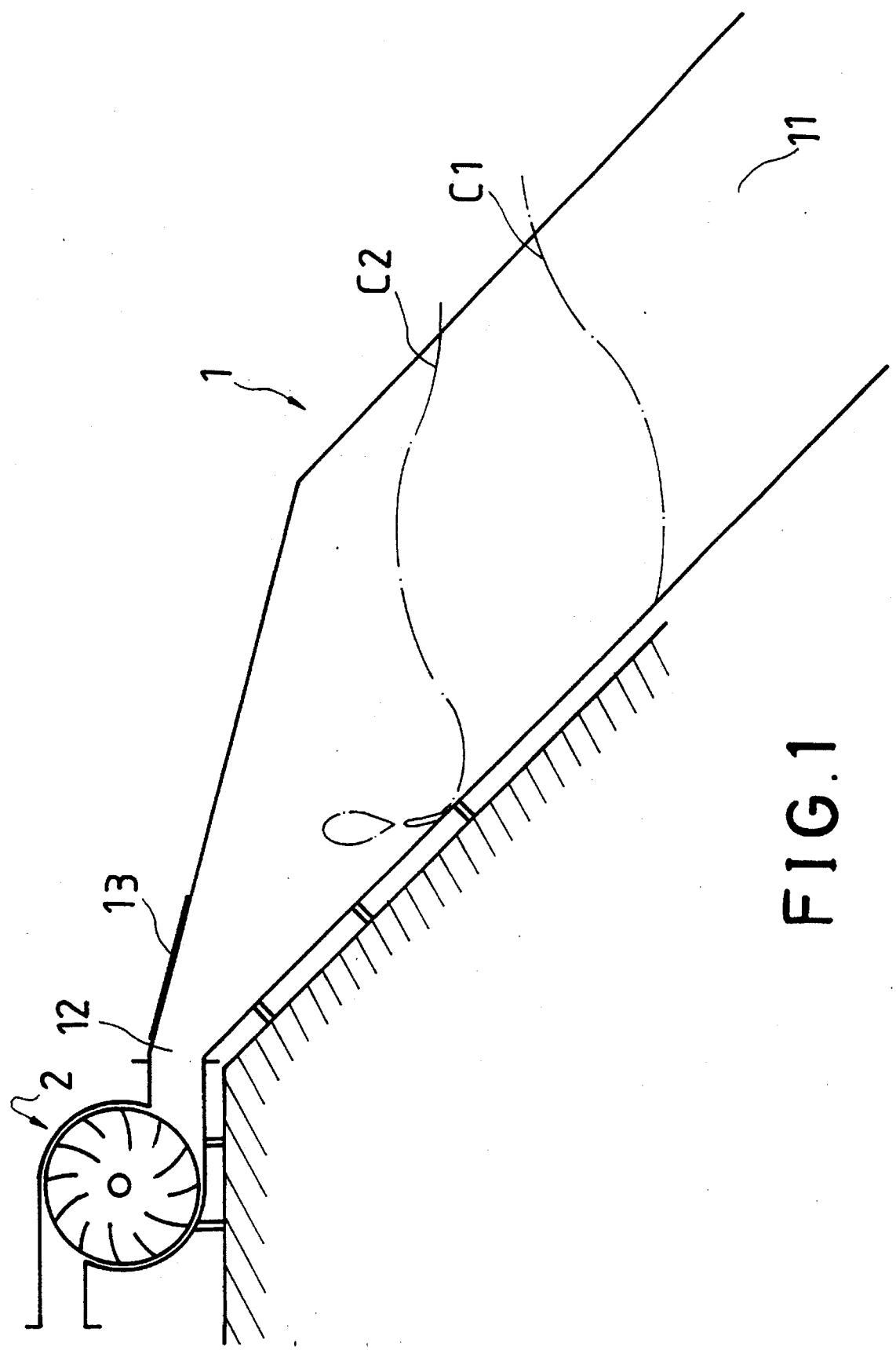
FIG. 1 is an installed view showing a tide-operated driving system installed in the seaside.

Referring to FIG. 1, a variable air chamber 1 is installed in the seaside, having a broad bottom opening 11 disposed under the water of the sea and a small top opening 12 communicated with the broad bottom opening 11 and disposed above the seaside. The broad bottom opening 11 must be disposed below the water level of the ebb tide C1. Because the broad bottom opening 11 and the small top opening 12 are disposed in communication with the atmosphere, the inside pressure is balanced with the atmosphere pressure and, because the broad bottom opening 11 is put under the water of the sea, the tide of the sea rises and falls in the variable air chamber 1, causing the volume of the variable air chamber 1 to change. Of course, the changes of the waves also vary the volume of the variable air chamber 1. The changes of the volume of the variable air chamber 1 between the ebb tide C1 and the flowing tide C2 produce a force to drive air in and out of the variable air chamber 1 through the small opening 12. Furthermore, the inner diameter of the variable air chamber 1 reduces gradually from the broad bottom opening 11 toward the small top opening 12. Therefore, when the tide rises and falls, a high-pressure flow of air is rapidly driven in and out of the small top opening 12 to move a motor 2.

Figure 2:
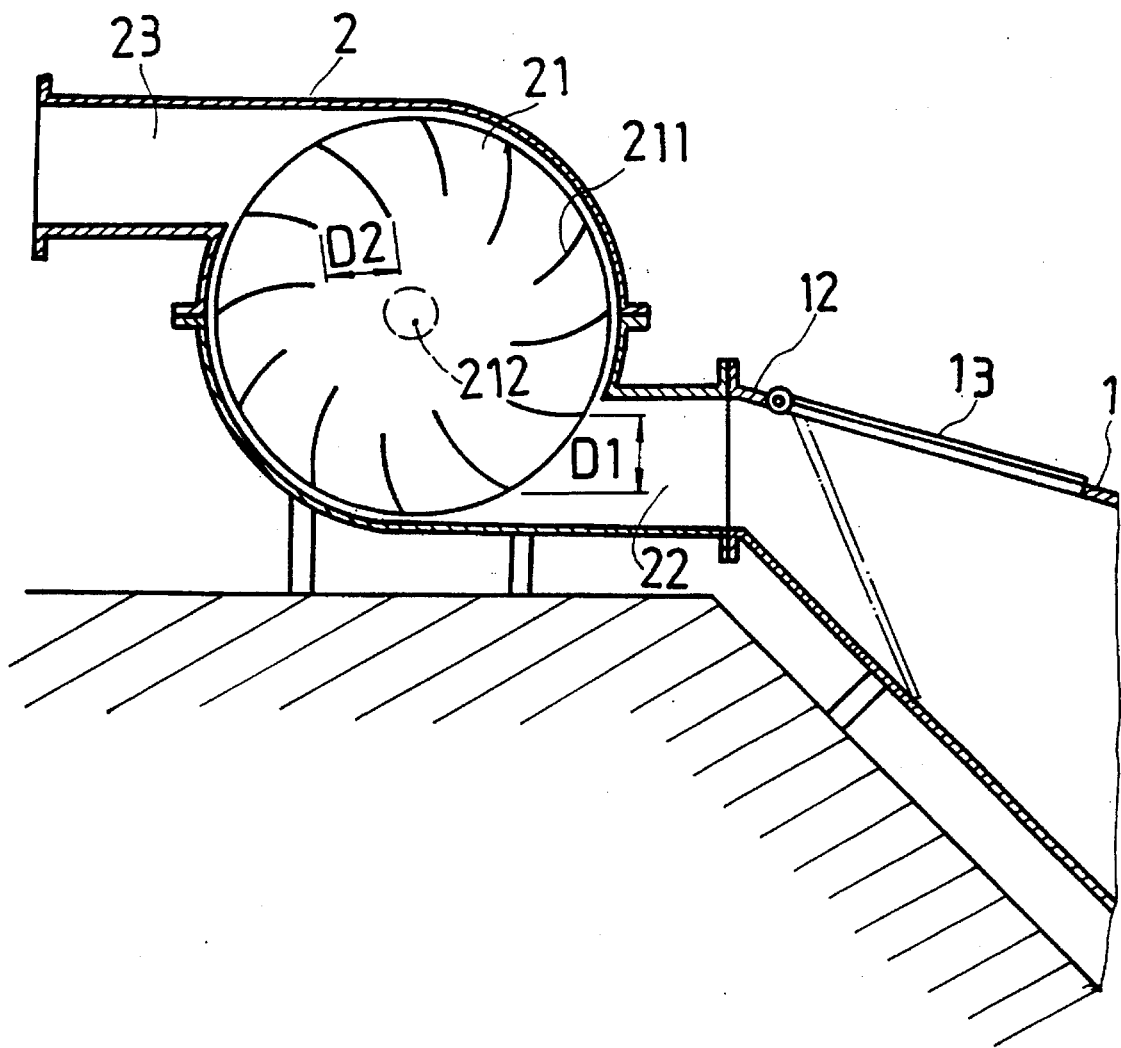
FIG. 2 is a partial view of FIG. 1 in an enlarged scale.

Referring to FIG. 2, the motor 2 converts the reciprocating flow of air into rotary power, comprised of a rotor 21 having a center shaft 212 and a plurality of centrifugal vanes 211 spaced around the center shaft 212, a first air port 22 communicated with the small top opening 12 of the variable air chamber 1, and a second air port 23 reversed to the first air port 22. The first air port 22 and the second air port 23 are respectively disposed tangent to the periphery of the vanes 211 of the rotor 21 in reversed directions. Therefore, the flow of air which is driven in and out of the Small top opening 12 of the variable air chamber 1 will be driven in and out of the second air port 23 through the rotor 21 via the first air port 22, i.e., the reciprocating flow of air will be forced to act against the rotor 21. According to the present design, either the flow of air flows from the first air port 22 to the second air port 23 or from the second air port 23 to the first air port 22, the rotor 21 will be driven to rotate in a specific direction. For example, the rotor 21 shown in FIG. 2 will be driven to rotate clockwise. Because the vanes are made of smoothly curved shape having a respective smoothly curved front surface, which faces against the flow of air when moved to the first or second air port 22 or 23, the rotor 21 will not be driven to rotate in the reversed direction during the reciprocating of the flow of air.

Figure 4:
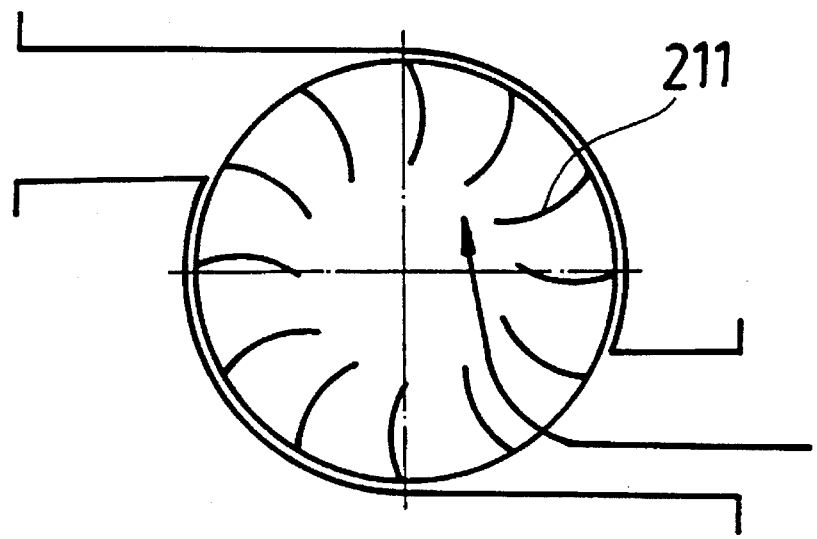
FIGS. 4A, 4B, and 4C show different arrangements of the vanes according to the present invention.
Figure 4:
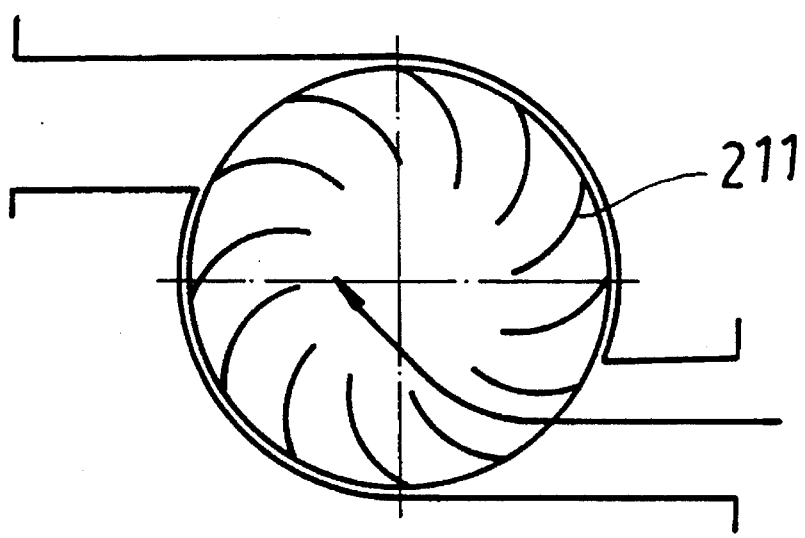
Figure 4:
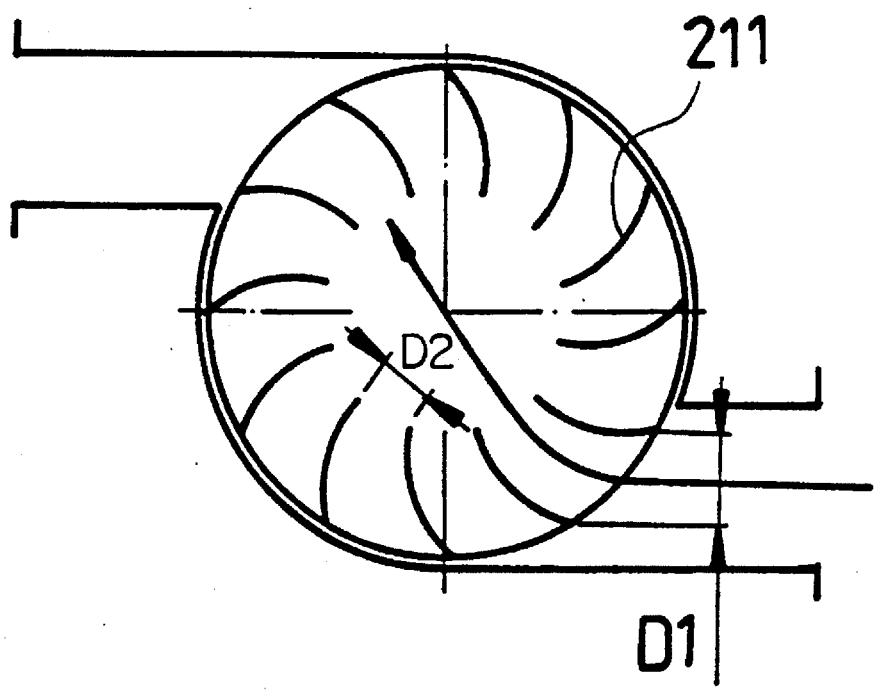

FIGS. 4A, 4B, and 4C show different arrangements of the vanes 211. The arrangements of the vanes 211 shown in FIGS. 4A and 4B will guide the intake flow of air from one air port to flow through the rotor in a course away from the center of the rotor, and therefore the intake flow of air will not be directly guided to the opposite air port and will become held up at the inside of the rotor. Therefore, these two arrangements cannot fully utilize the force of the intake flow of air. The arrangement of the vanes 211 shown in FIG. 4C are so made and arranged that the intake flow of air from one air port can be guided through the center of the rotor to the opposite air port directly, and therefore the flow of air can be fully utilized to propel the vanes 211. According to the arrangement shown in FIG. 4C, the pitch between each two adjacent vanes is broader at the periphery area D1 than at the center area D2 of the rotor, i.e., the pitch reduces gradually from the periphery of the rotor toward the center thereof. If the vanes 211 are made longer, the change of the pitch will become greater. However, if the vanes 211 are made shorter, the change of the pitch will become insignificant. According to tests, the best performance is achieved when the vanes 211 are made of two different lengths alternatively arranged around the center shaft 212 of the rotor 2 (see FIG. 2). The arrangement of FIG. 2 can increase the revolving speed of the rotor by about ⅓ of that shown in FIG. 4C. Furthermore, a choker 13 is made on the variable air chamber 1 near the small top opening 12 (see FIG. 2). The choker 13 can be moved into the operative position (see the imaginary line shown in FIG. 2), the flow of air is guided away from the rotor 21, and therefore the rotor 21 can be stopped for a repair or maintenance work.

Figure 3:
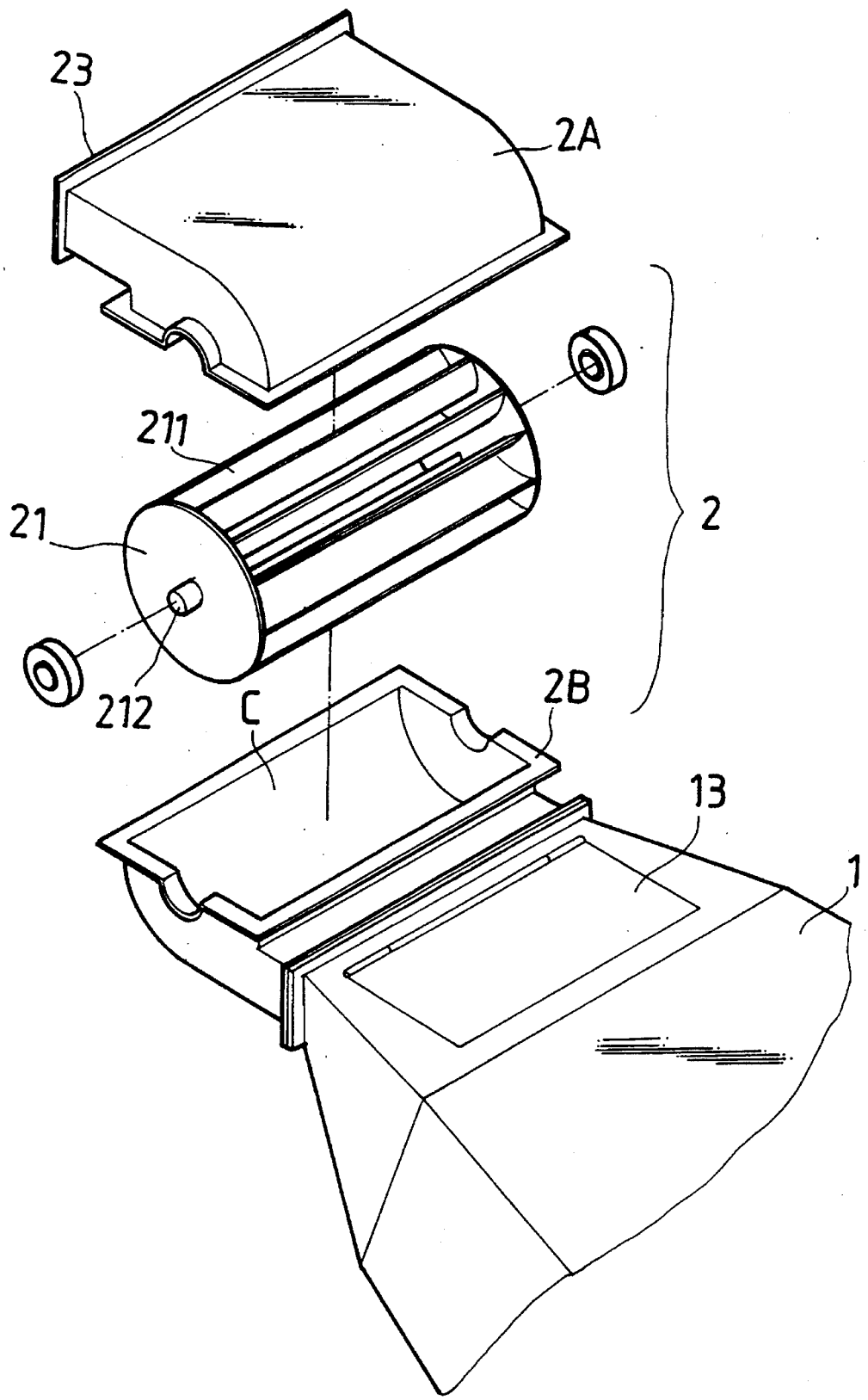
FIG. 3 is an exploded view of a motor according to the present invention.

FIG. 3 is an exploded view of the motor 2. The motor 2 comprises an upper shell 2A, a bottom shell 2B, and the aforesaid rotor 21. The upper and bottom shells 2A and 2B are connected together, defining a receiving chamber C. The rotor 21 is mounted within the receiving chamber C. When installed, the center shaft 212 of the rotor 21 extends out of the receiving chamber C and coupled to the mechanism to be operated. When the vanes 211 of the rotor 21 are forced by the flow of air passing through, the center shaft 212 is rotated to drive the external mechanism.

While only one embodiment of the present invention has been shown and described, it will be understood that various modifications and changes could be made without departing from the spirit and scope of the invention. For example, two or more motors may be arranged in parallel and respectively connected to the small top opening 12 of the variable air chamber 1 and simultaneously driven by the reciprocating flow of air, which is induced by the movement of the tide.

What is claimed is:

1. A tide-operated driving system comprising:

a variable air chamber having a broad bottom opening disposed under the water of the sea below the elevation of the ebb tide and a small top opening communicated with said broad bottom opening and disposed above the elevation of the flow tide, the inner diameter of said variable air chamber reducing gradually from said broad bottom opening toward said small top opening; and a motor having a center shaft, a plurality of centrifugal type vanes spaced around said center shaft, a first air port and second said center shaft disposed tangent to the periphery of said vanes in reversed directions, said first air port communicating with said small top opening for allowing reciprocating currents of air, which are induced by the movement of the tide, to pass through said vanes in a fixed direction, causing said vanes to rotate said center shaft said vanes being of two different lengths alternatively arranged around said center shaft for guiding the reciprocating flow of air from one air port to the other through the center of said rotor.

2. The tide-operated driving system of claim 1 wherein said variable air chamber comprises a choker disposed near said small top opening and controlled to guide the reciprocating flow of air away from passing through said said motor via said small top opening.

* * * * *